United States Patent [19]

Paddington

[11] 4,079,752
[45] Mar. 21, 1978

[54] PIPE COUPLINGS

[75] Inventor: Arthur Loftus Paddington, Shifnal, England

[73] Assignee: Bridon Engineering Limited, Sheffield, England

[21] Appl. No.: 770,843

[22] Filed: Feb. 22, 1977

Related U.S. Application Data

[63] Continuation of Ser. No. 564,114, Apr. 1, 1975, abandoned.

[30] Foreign Application Priority Data

Apr. 11, 1974 United Kingdom ............... 16093/74

[51] Int. Cl.² ............................................. F16L 27/08
[52] U.S. Cl. ............................... 137/615; 137/614.06; 251/149.9
[58] Field of Search ........................... 137/614.06, 615; 251/149.9; 141/387

[56] References Cited

U.S. PATENT DOCUMENTS

| | | | |
|---|---|---|---|
| 2,927,607 | 3/1960 | Bily | 137/615 |
| 3,114,392 | 12/1963 | Harper | 137/615 |
| 3,746,060 | 7/1973 | Janssen et al. | 137/615 X |

Primary Examiner—Alan Cohan
Assistant Examiner—Gerald A. Michalsky
Attorney, Agent, or Firm—Morgan, Finnegan, Pine, Foley & Lee

[57] ABSTRACT

Pipe coupling assembly for mounting on a tank vessel for use in transferring liquid to or from a single point mooring buoy, or for use in other locations where use of a loading arm is not practicable. The assembly comprises a pipe coupling capable of being releasably clamped to a pipe or hose end. Conduit means including an elbow is connected between the pipe coupling and a swivel assembly. A support is arranged to support the swivel assembly spaced from a support surface so that the pipe coupling is rotatably moveable about the swivel assembly between an operative downwardly facing position and a rearwardly and/or upwardly facing retracted position relative to the support surface. A pair of pipe couplings, arranged to operate in synchronism, may be mounted on a pair of swivels to allow simultaneous coupling to a pair of hoses.

19 Claims, 11 Drawing Figures

PIPE COUPLINGS

This is a continuation, of application Ser. No. 564,114 filed Apr. 1, 1975, now abandoned.

The invention relates to pipe couplings and more particularly, although not exclusively, to such couplings which are suitable for mounting on a tank vessel and/or an oil production or other platform for use in loading and/or unloading such tank vessel utilising the so called single point mooring technique.

According to one aspect of the invention there is provided a pipe coupling assembly which comprises a pipe coupling, capable of being releasably clamped to a pipe or hose end in use, conduit means including an elbow connected, between the pipe coupling and at least one swivel assembly, and support means arranged to support the swivel assembly, spaced from a support surface, whereby the pipe coupling is rotatably moveable about said swivel assembly, between an operative downwardly facing position relative to the support surface and a rearwardly and/or upwardly facing retracted position relative to the support surface.

Preferably means is provided for driving the pipe coupling between its operative and retracted positions. Such driving means may comprise an hydraulic rotary actuator such as a vane motor, or a winch or fluid actuable ram means.

The assembly may be mounted by said support means on a base plate assembly comprising said support surface, which may also support the driving means. Stop means may be located on the base plate assembly for preventing the pipe coupling from moving beyond predetermined operating and/or retracted positions.

Further swivel means may be interposed between the conduit means and the pipe coupling, said further swivel means being arranged to allow free part rotational movement of the pipe coupling to follow movement of a pipe or hose coupled thereto, in use.

The or each conduit means may have a ball valve or butterfly valve interposed therein for controlling the flow of fluid therethrough and such valve may be hydraulically actuable.

Means may be provided, arranged in use, to cooperate with and control actuation of valve means located in a pipe or hose coupled to the pipe coupling. Said valve control means may comprise fluid actuable ram means which may comprise a first hydraulic ram arranged to actuate said pipe or hose valve to an open condition and a second hydraulic ram arranged to actuate said pipe or hose valve to a closed condition.

The pipe coupling assembly may include an attachment means, intended to be permanently attached to a pipe or hose end to be releasably coupled to the pipe coupling, the attachment means comprising a tubular member including a control valve for controlling fluid flow therethrough. Said control valve may include actuation means extending from the tubular member and arranged to cooperate with said valve control means, in use.

The pipe coupling assembly may include master control means arranged, in use, to ensure that the valve control means cannot be operated to cause actuation of the pipe or hose valve to its open condition until the pipe coupling is in a clamped condition coupled to a pipe or hose and to ensure that the pipe coupling cannot be actuated to an unclamped condition until the valve control means has been operated to cause actuation of the pipe or hose valve to its closed condition.

The pipe coupling may be fluid actuable.

The master control means may comprise hydraulic circuit means with an hydraulic interlock to provide such control. Said hydraulic circuit means may be connected with an hydraulic pump and with an hydraulic accumulator, associated with said pump, to facilitate emergency actuation of the hydraulic circuit means upon failure of the hydraulic pump. Said master control means may be such that the rotary actuator is short-circuited when the pipe coupling is operatively clamped to a hose, in use, whereby the swivel means permit movement of the pipe coupling with movement of the hose.

Valve controlled hose attachment means may be located in the conduit means to facilitate attachment of a hose thereto for flushing of the conduit means before and/or after use.

A pair of pipe coupling assemblies may be provided with the pipe couplings thereof arranged to operate in synchronism. Drive means of such pair of assemblies may also be arranged to operate in synchronism and the assemblies may be mounted on a common base plate assembly.

The foregoing and further features of the invention may be more readily understood from the following description of three preferred embodiments thereof, by way of example, with reference to the accompanying drawings, in which.

Figure 1:
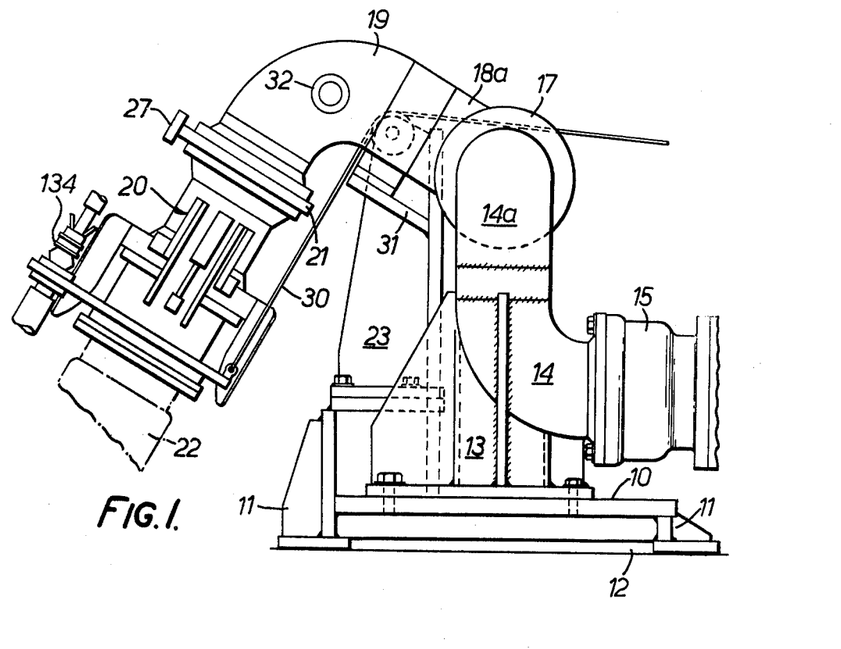
FIG. 1 is a side elevational view of a pipe coupling assembly.
Figure 2:
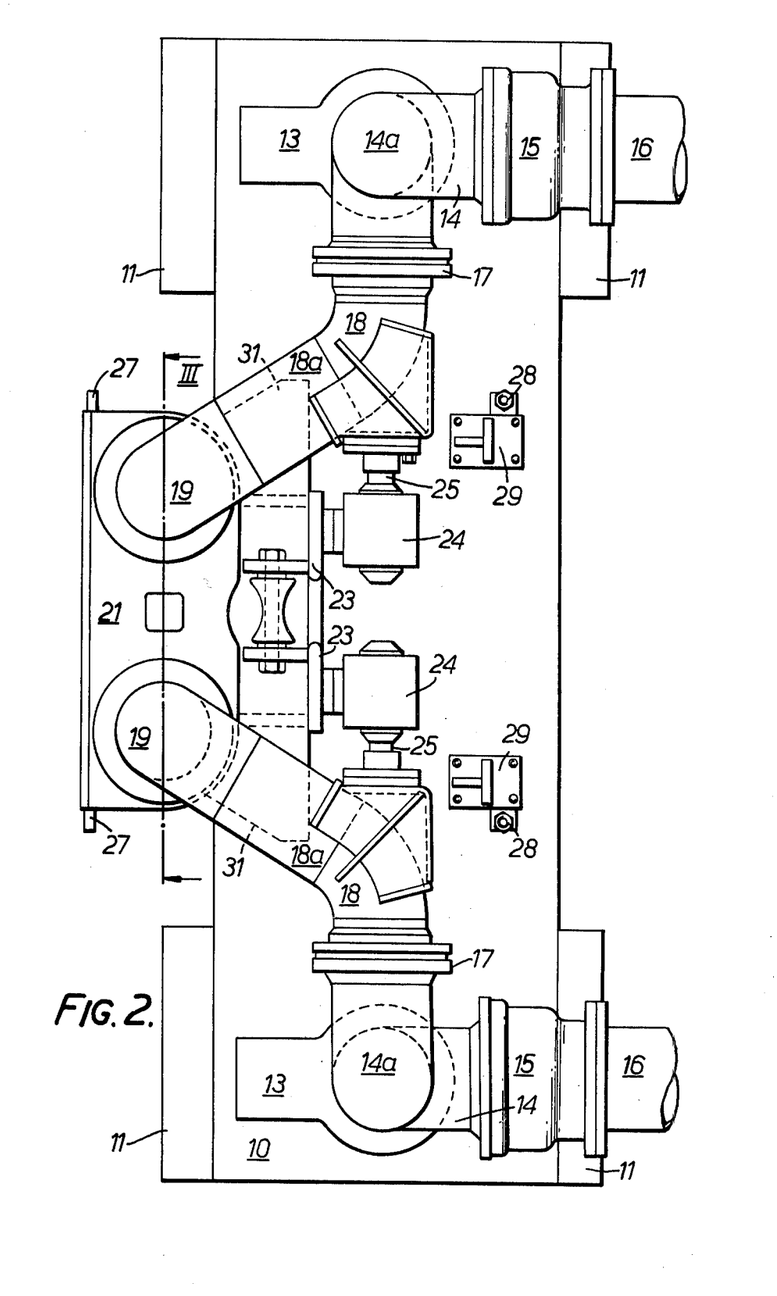
FIG. 2 is a plan view of the pipe coupling assembly of FIG. 1.

Referring firstly to FIGS. 1 and 2 there is shown a pipe coupling assembly comprising a base plate 10 reinforced with channel members 11 which, in use, is located above the deck 12 of a tank vessel. Two support brackets 13 are attached to and upstanding from the base plate 10. Each support bracket 13 supports and is welded to a separate pipe elbow 14. Each elbow 14 is connected at one side via a ball valve or butterfly valve 15 to a pipe 16 which extends to manifolding (not shown) on the tank vessel. The other side of each elbow 14 is connected via an elbow 14a to a swivel 17, the other side of each of which is connected to an arcuate pipe 18. The other end of each arcuate pipe 18 is connected via a pipe 18a to a pipe elbow 19, the other end of each of which is connected to a pipe coupling 20 with a plate 21 interconnecting the two pipe couplings 20. In FIG. 1 one pipe coupling 20 is shown connected to a hose 22 extending from a platform (not shown).

The base plate 10 also carries two support brackets 23 which each mount a hydraulically actuated vane motor or actuator 24. The rotary outputs 25 from the motors 24 are connected to a respective arcuate pipe 18 where they are rigidly located. Further outputs from the motors 24 may be inter connected via a link member (not shown) to ensure that the motors 24 act in synchronism.

Each of the swivels 17 may comprise a swivel joint as disclosed in copending United Kingdom Patent application No. 12030/72 (U.S. Ser. No. 335,668 now U.S. Pat. No. 3,850,454). Each of the pipe couplings 20 may comprise an hydraulically actuated pipe coupling as disclosed in cognate United Kingdom Patent applications Nos. 10507/72 and 39480/72 (U.S. Ser. No. 333,737 now U.S. Pat. No. 3,865,409).

The pipe coupling 20 is normally retained in a retracted position with portions 27 carried on plate 21 engaged with and located by pivoted bolts and nuts 28 to support brackets or stops 29 carried on the inner side of base plate 10. In use, the bolts 28 are rotated out of engagement and motors 24 actuated so that pipes 18 and 19 and couplings 20 are rotated about the swivels 17 to a position where couplings 20 are downwardly facing over the outer side of base plate 10 and over the side of the tank vessel (as shown in FIG. 1). A winch (not shown) on the tank vessel is then actuated to winch the hoses 22, by way of cable 30, into position with couplings 20 where they are clamped thereto. The ball valves or butterfly valves 15 are then opened to allow passage of liquid to or from the tank vessel. The pipes 18 are engageable with stop members 31 carried by brackets 23 and left free to move about swivels 17 to accommodate movement of the hoses 22 with movement of the tank vessel. In this latter condition the motors 24 may be disengaged to allow such movement or may be retained in operation to damp such movement as hereinafter more fully described.

A hose connection 32 with a manually actuable valve incorporated therein is provided on each of elbows 19. A hose attached at such connections 32 can be utilised to flush the coupling conduits before and/or after use.

A manually operable self-sealing quick release coupling 134 (FIG. 1 only) may be provided for connection of a bunkering hose for the supply of fuel oil to operate the pumps for loading the vessel.

Figure 3:
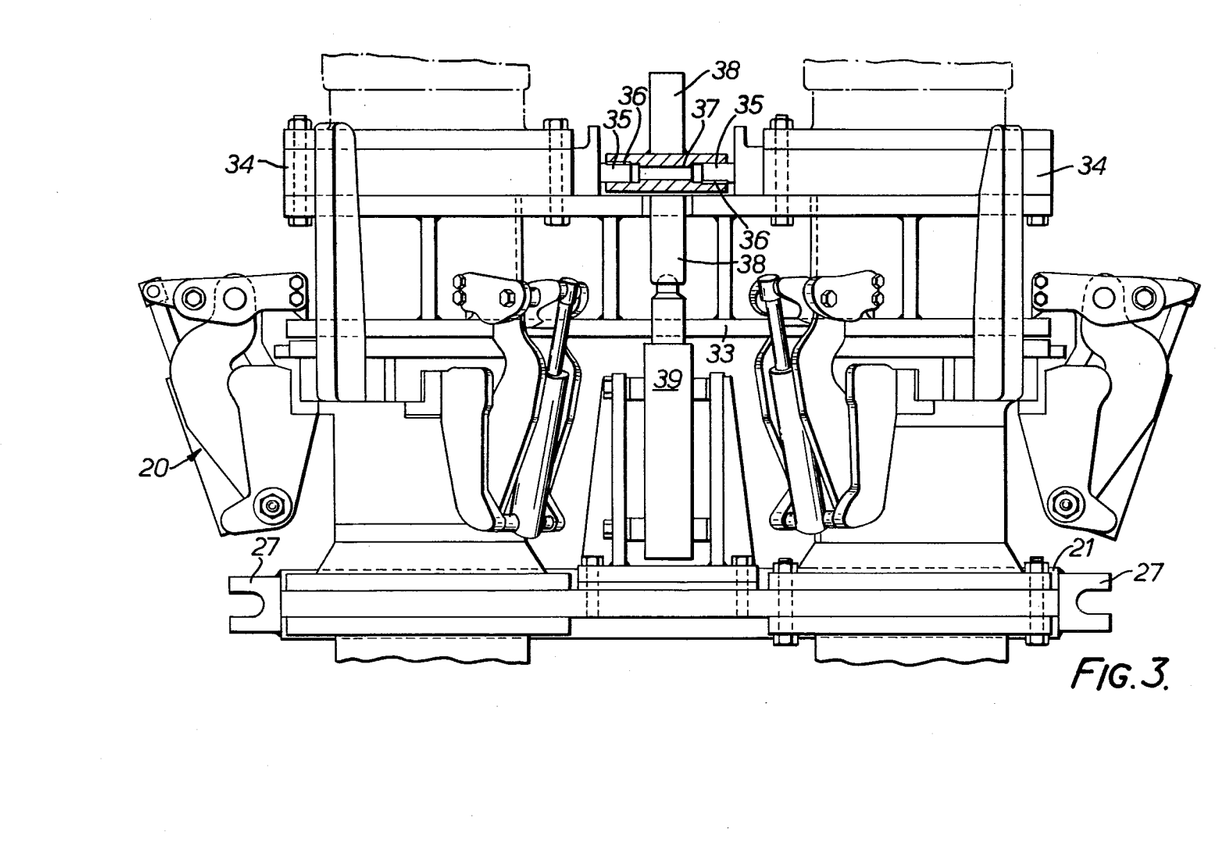
FIG. 3 is a sectional view along the line III—III of FIG. 2.

Referring now to FIG. 3 the pipe couplings 20 are shown clamping a flange member 33 common to both hoses 22. The hoses 22 are attached to member 33 with respective butterfly valves 34 interposed therebetween. The valves 34 may be of the type as disclosed in United Kingdom Pat. specification No. 1,301,099. Each of valves 34 has an actuation shaft 35 extending therefrom and retained by keys 36 in the ends of an actuation member 37. Member 37 has two arms 38 carried thereon for cooperation with hydraulic rams 39 (one only shown) carried on member 21. With an arrangement clamped as shown one of rams 39 is actuated to open valves 34 and before the couplings 20 are released the other ram 39 is actuated to close valves 34 as will hereinafter be more fully described.

Figure 4A:
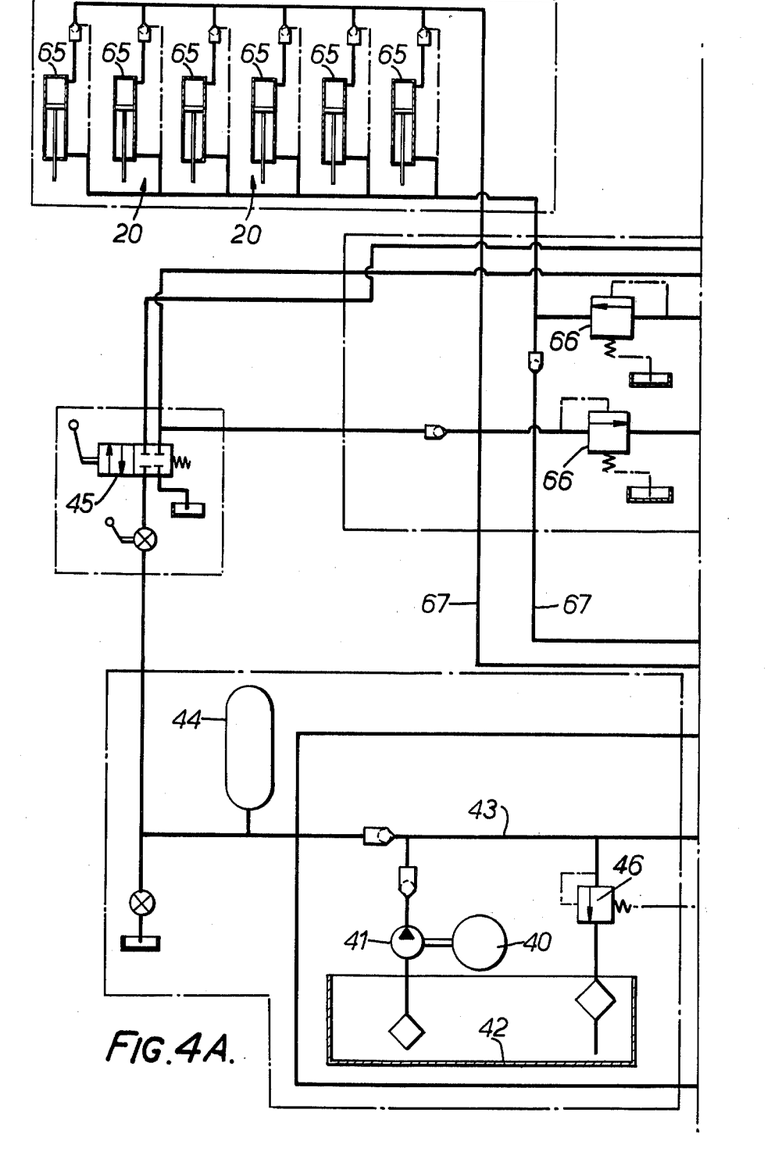
FIGS. 4A, 4B and 4C show an hydraulic circuit diagram of a control circuit for the pipe coupling assembly of FIGS. 1, 2 and 3, with FIG. 4D showing the arrangement of FIGS. 4A, 4B and 4C.
Figure 4B:
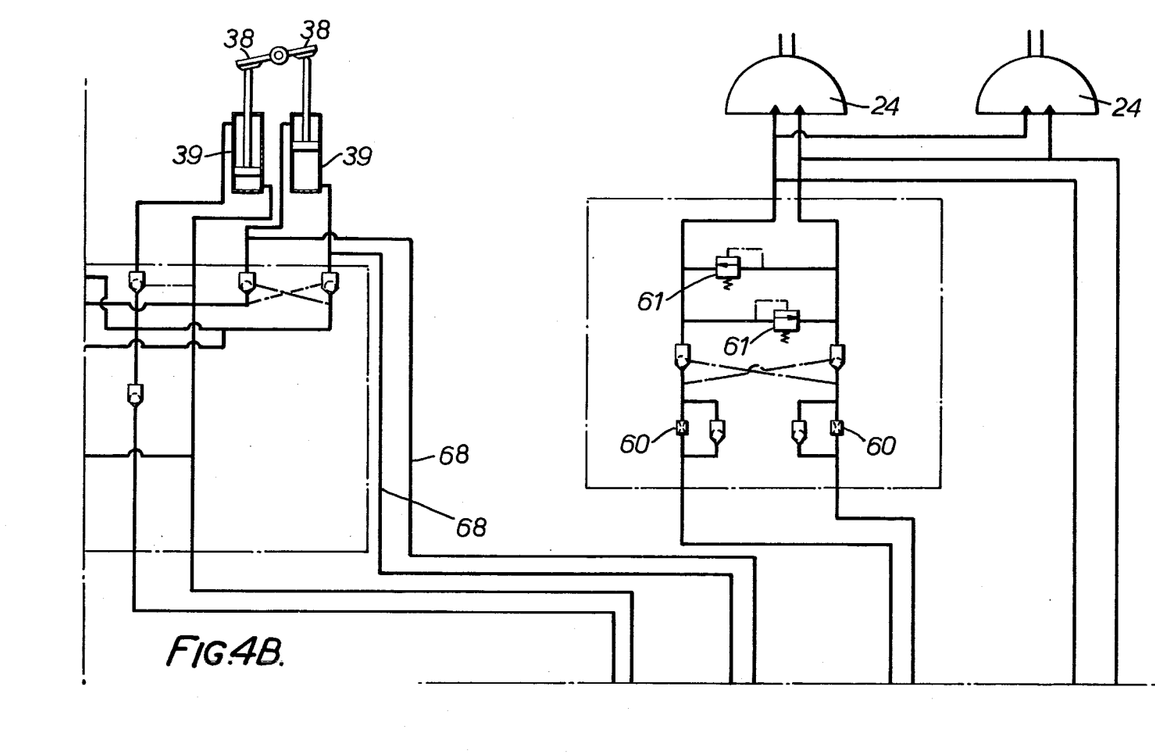
Figure 4C:
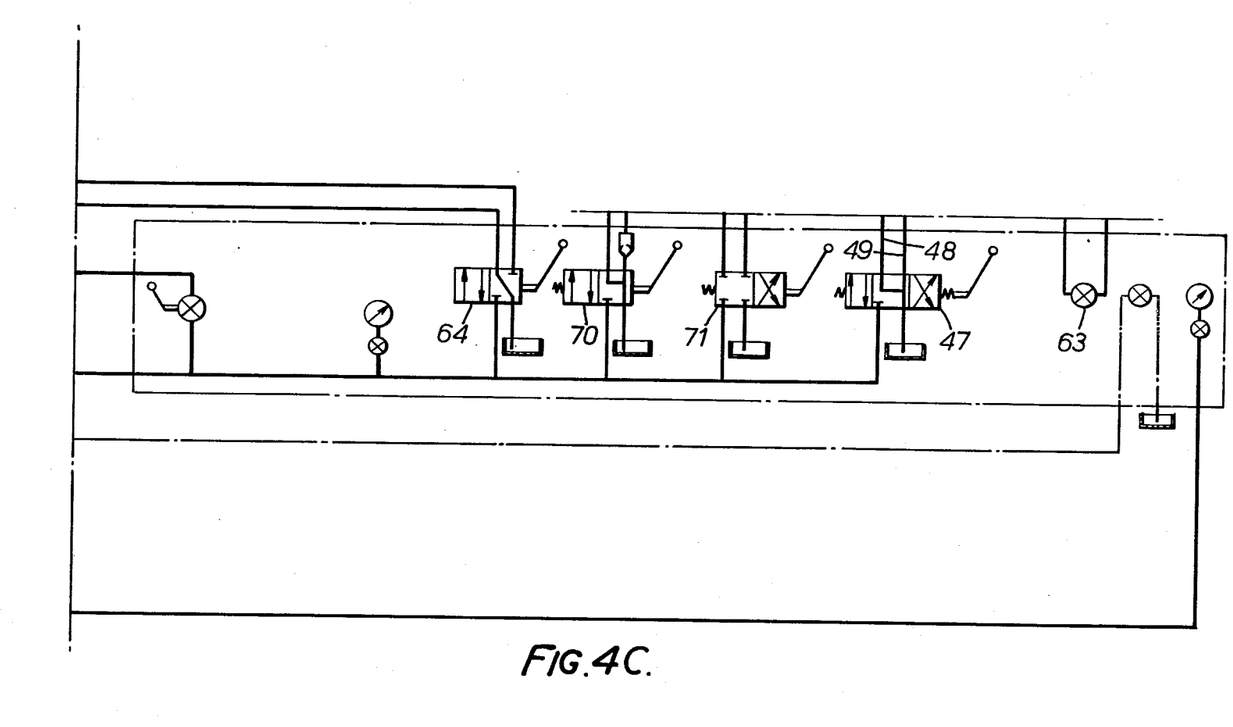
Figure 4D:
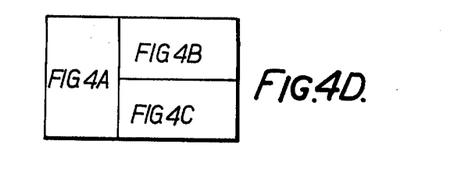

Referring now to FIGS. 4A, 4B and 4C, there is shown an hydraulic control circuit for controlling the coupling assembly of FIGS. 1 to 3. An electric motor 40 is arranged to drive a pump 41 to supply hydraulic fluid from a sixty gallon tank 42 to a common supply line 43. The supply line 43 feeds a two gallon accumulator 44 for actuating an emergency disconnect control valve 45. A hand operated pump (not shown) may be connectible by a quick release self-sealing coupling to the accumulator 44 for recharging the accumulator 44 upon a power failure. A relief valve 46 connects supply line 43 back to tank 42.

A manually operable valve 47 controls the hydraulic flow from line 43 to control lines 48 and 49 to both the motors 24 to control the direction of rotation thereof. Restrictor valves 60 are provided in both lines 48 and 49 and check and relief valves 61 are also provided for each line 48 and 49. A valve 63 is provided for interconnecting the motors 24, if required, to provide freewheeling when the pipe couplings are coupled to hoses, in use. A valve 64 controls clamping and unclamping of rams 65 of the pipe couplings 20. Sequence valves 66 are coupled between the control lines 67 for rams 65 to control lines 68 for actuators 39 of the valves 34. The valves 66 override control of a valve 70 which provides fluid control of actuators 39 so that valves 34 cannot be opened until couplings 20 are clamped. Couplings 20 cannot be unclamped until valves 34 are closed by actuation of a valve 71. The arrangement is also such that in an emergency the valves 34 can be closed simultaneously with unclamping of couplings 20.

Various other check and one way valves are incorporated in the system which are normal safety features used in hydraulic circuits and are therefore not disclosed in detail.

Figure 5:
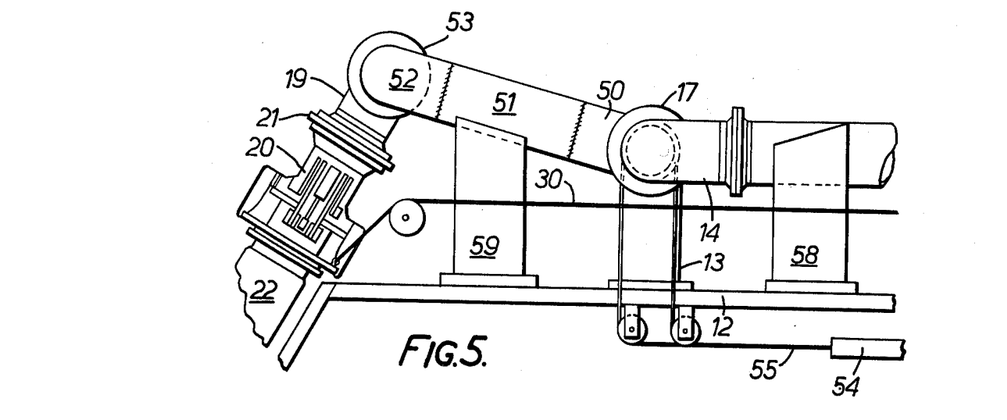
FIG. 5 is a side elevational view of an alternative pipe coupling assembly.
Figure 6:
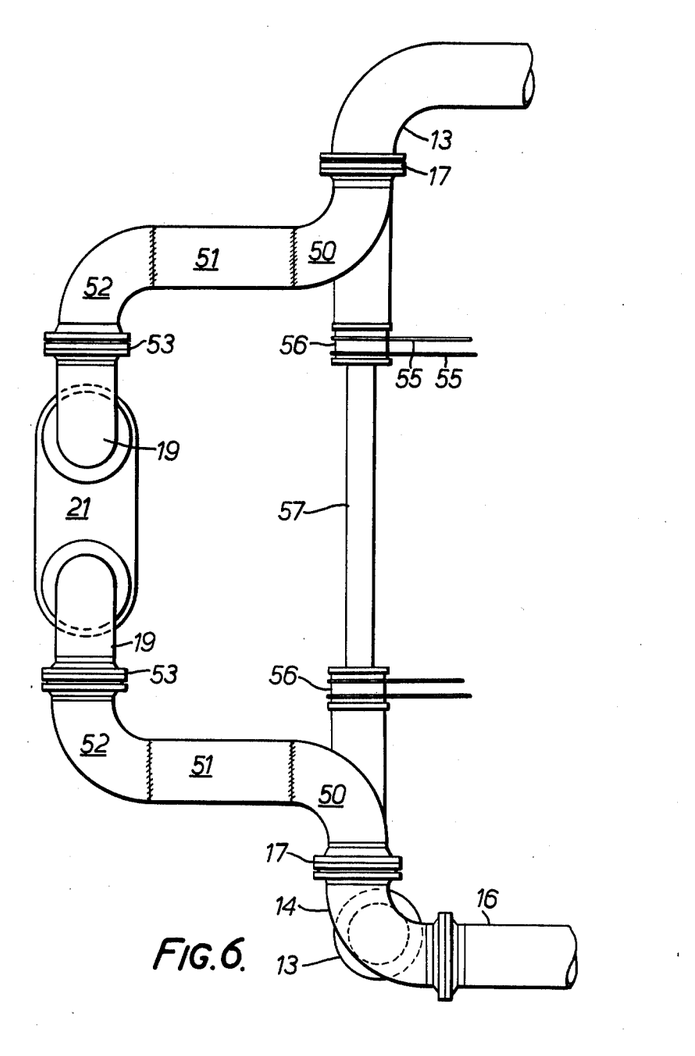
FIG. 6 is a plan view of the pipe coupling assembly of FIG. 5.

Referring now to FIGS. 5 and 6 there is shown a pipe coupling assembly similar to that described with reference to FIGS. 1 to 3. In this embodiment each pipe 18 is replaced by an elbow 50, a length of straight pipe 51, an elbow 52 and a further swivel 53 located between the swivels 17 and elbows 19. The further swivels 53 are provided to allow movement of couplings 20 with movement of hoses 22, in use, whilst swivels 17 provide the required movement of couplings 20 between the operative and retracted positions. Stop members 58 and 59 are engaged by pipe 51 in the retracted and operative positions respectively.

The hydraulic vane motors 24 of the previous embodiment are replaced by hydraulic rams 54 which act via cables 55 on pulleys 56 carried on a shaft 57. The shaft 57 is attached to elbows 50 so as to rotate the whole assembly between the retracted and operative positions as required.

Figure 7:
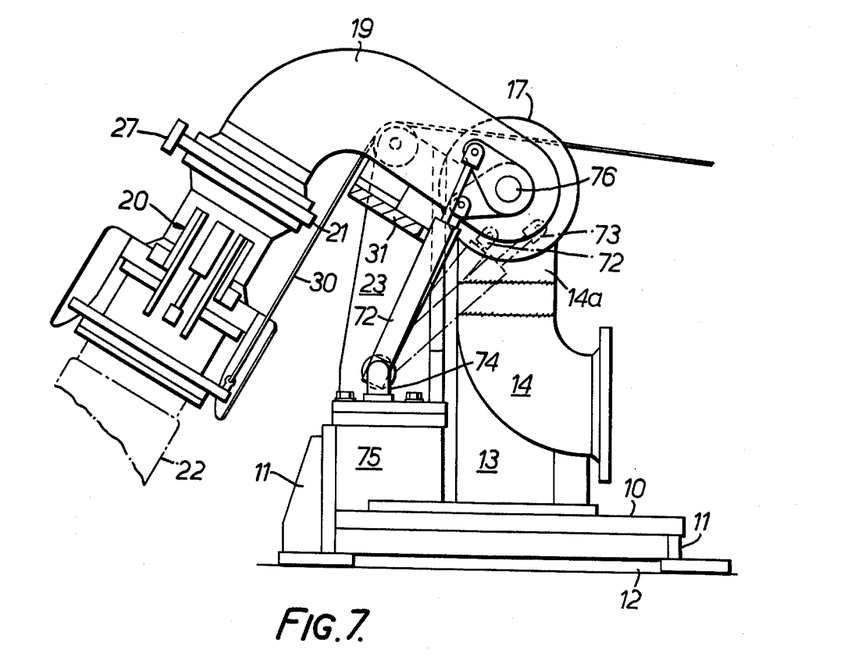
FIG. 7 is a side elevational view of a further alternative pipe coupling assembly.
Figure 8:
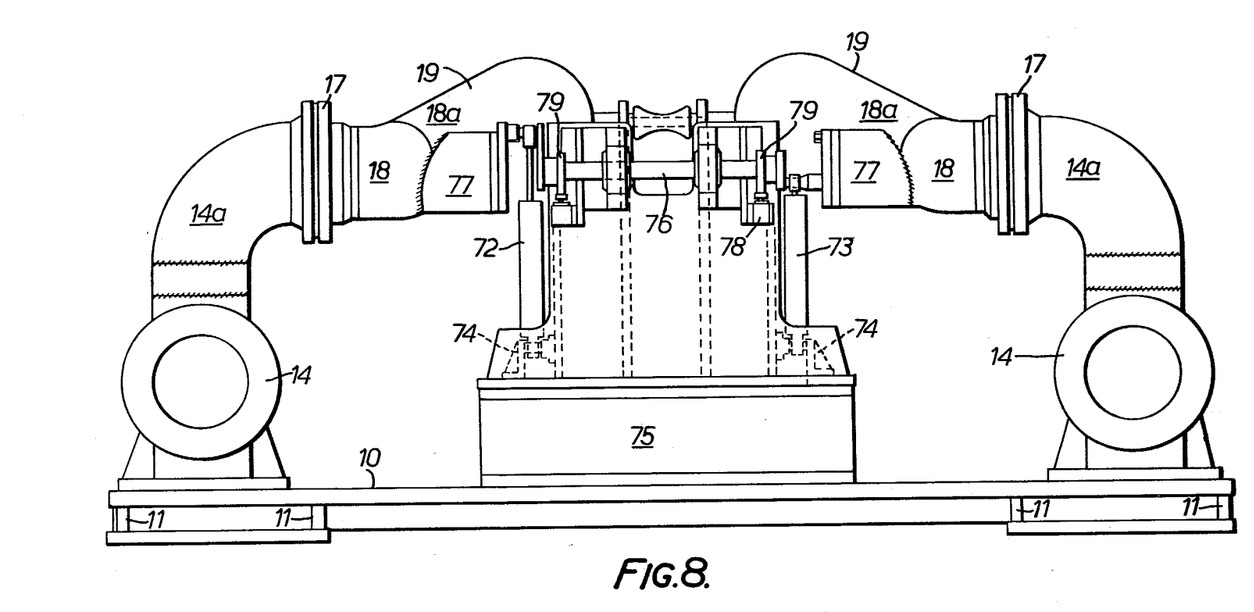
FIG. 8 is an end elevational view of the pipe coupling assembly of FIG. 7.

Referring now to FIGS. 7 and 8 there is shown a pipe coupling assembly similar to that described with reference to FIGS. 1 to 3. In this embodiment the rotary actuators 24 are replaced by hydraulic actuated rams 72 and 73 for moving the pipe couplings 20 between the retracted and operative positions. The cylinders of rams 72 and 73 are pivotally mounted on brackets 74 located on a support member 75 carried on base plate 10. The pistons of rams 72 and 73 are connected to a crankshaft 76 which extends between members 77 attached to arcuate pipes 18. The rams 72 and 73 are actuated in turn between the positions as indicated in FIG. 7 under control of changeover valves 78 actuated by cams 79 carried on crankshaft 76 to move elbow 19 through an arc of 270°, indicated by arrow A on FIG. 7, between operative and retracted positions.

The embodiments of FIGS. 5 and 6 and of FIGS. 7 and 8 would also be operated by an hydraulic control circuit similar to that shown in FIG. 4.

Although all embodiments illustrated show pairs of pipe couplings for coupling to pairs of hoses the arrangements could equally well be used for single pipe couplings for coupling to single hoses or for three or more pipe couplings for coupling to three or more hoses.

The assemblies described are particularly for use on tank vessels but also could be used on oil production platforms or in other instances where it is required to load or unload tank vessels and loading arms cannot be used. With the arrangements shown one hose and associated coupling can be used for taking in crude oil to load a vessel from a single point mooring buoy whilst the other hose and associated coupling can be used simultaneously for the discharge of sea water ballast from the tank vessel.

What is claimed is:

1. A compact pipe coupling assembly capable of being mounted on the deck of a vessel or a small platform or the like located at sea, comprising:
    a pipe coupling;
    means for releasably clamping one end of said pipe coupling to a hose end;
    conduit means connected to the other end of said pipe coupling, said conduit means including an elbow and an arcuate pipe section, said elbow and arcuate pipe section lying in separate fixed planes which are perpendicular to one another;
    a swivel assembly connected to one end of said arcuate pipe section of said conduit means, said swivel assembly being freely rotatable about a horizontal axis of rotation;
    support means including a base plate assembly and first support brackets extending upwardly from said base plate assembly, said first support brackets mounting said swivel assembly at a position above and spaced apart from said base plate assembly;
    said pipe coupling being rotatably movable about said horizontal axis of rotation of said swivel assembly between an operative position, facing downwardly and outwardly relative to said base plate assembly, and a retracted position, facing rearwardly and inwardly relative to said base plate assembly;
    hydraulic rotary actuator means for rotating said pipe coupling between said operative and retracted positions;
    said support means further including second support brackets mounting said hydraulic rotary actuator means separate from said first support brackets carrying said swivel assembly; and
    means drivingly connecting said hydraulic rotary actuator means directly to said arcuate pipe section of said conduit means to rotate said arcuate pipe section about said horizontal axis of rotation of said swivel assembly and thereby simultaneously also rotating said pipe coupling about said horizontal axis of rotation of said swivel assembly.

2. A pipe coupling assembly as claimed in claim 1 wherein said hydraulic rotary actuator means is a vane motor.

3. A pipe coupling assembly as claimed in claim 1, including first stop means located on said base plate assembly preventing said pipe coupling from moving beyond a predetermined retracted position.

4. A pipe coupling assembly as claimed in claim 1, including stop means preventing said pipe coupling from moving beyond a predetermined operative position, and further including means for disengaging said hydraulic rotary actuator means when said pipe coupling is in said operative position so as to permit the connected pipe coupling, hose and conduit means to freely rotate about said swivel assembly.

5. A pipe coupling assembly as claimed in claim 1 including valve controlled hose attachment means located in said conduit means for attachment of a hose thereto for flushing of said conduit means before and after use.

6. A pipe coupling assembly comprising at least two pipe coupling assemblies as claimed in claim 1, including means for operating said pipe couplings in synchronism.

7. A pipe coupling assembly comprising a pair of pipe coupling assemblies as claimed in claim 1, including means for operating said pipe couplings and actuation means in synchronism, and means mounting said pipe coupling assemblies on a common base plate assembly.

8. A pipe coupling assembly as claimed in claim 1 wherein said conduit means includes valve means interposed therein for controlling flow of fluid therethrough.

9. A pipe coupling assembly as claimed in claim 8 wherein the conduit valve means is hydraulically actuable.

10. A pipe coupling assembly as claimed in claim 1 including valve means located in said hose coupled to said pipe coupling and means for controlling actuation of the hose valve means.

11. A pipe coupling assembly as claimed in claim 10 wherein the hose valve control means comprises fluid actuable ram means.

12. A pipe coupling assembly as claimed in claim 11 wherein said fluid actuable ram means comprises a first hydraulic ram arranged to actuate said hose valve means to an open condition and a second hydraulic ram arranged to actuate said hose valve means to a closed condition.

13. A pipe coupling assembly as claimed in claim 10, in combination with attachment means fixedly attached to a hose end to be releasably coupled to said pipe coupling, said attachment means comprising a tubular member including a control valve for controlling fluid flow therethrough.

14. A pipe coupling assembly as claimed in claim 13 wherein the attachment control valve includes actuation means extending from said tubular member and arranged to cooperate with said attachment control valve.

15. A pipe coupling assembly as claimed in claim 10, including master control means preventing said hose valve control means from operating to cause actuation of said hose valve means to its open condition until said pipe coupling is in a clamped condition coupled to said hose and also to prevent said pipe coupling from being actuated to an unclamped condition until said hose valve control means has been operated to cause actuation of said hose valve means to its closed condition.

16. A pipe coupling assembly as claimed in claim 15 wherein said pipe coupling is fluid actuable.

17. A pipe coupling assembly as claimed in claim 15 wherein said master control means comprises hydraulic circuit means with an hydraulic interlock to provide such control.

18. A pipe coupling assembly as claimed in claim 17 wherein said hydraulic circuit means is connected with an hydraulic pump and with an hydraulic accumulator associated with said pump to permit emergency actuation of said hydraulic circuit means in the event of a failure of said hydraulic pump.

19. A pipe coupling assembly as claimed in claim 15 wherein said master control means short circuits said hydraulic rotary actuator when said pipe coupling is operatively clamped to a hose, whereby said pipe coupling rotates freely about said swivel assembly so as to accommodate movement of said hose.

* * * * *